No. 845,633. PATENTED FEB. 26, 1907.
P. HALLOT.
BRAKE FOR VEHICLES.
APPLICATION FILED NOV. 27, 1903.

6 SHEETS—SHEET 1.

Witnesses

Inventor
Paul Hallot
By
James L. Norris.
Atty.

No. 845,633. PATENTED FEB. 26, 1907.
P. HALLOT.
BRAKE FOR VEHICLES.
APPLICATION FILED NOV. 27, 1903.

6 SHEETS—SHEET 3.

Witnesses

Inventor
Paul Hallot
By James L. Norris

No. 845,633. PATENTED FEB. 26, 1907.
P. HALLOT.
BRAKE FOR VEHICLES.
APPLICATION FILED NOV. 27, 1903.
6 SHEETS—SHEET 4.
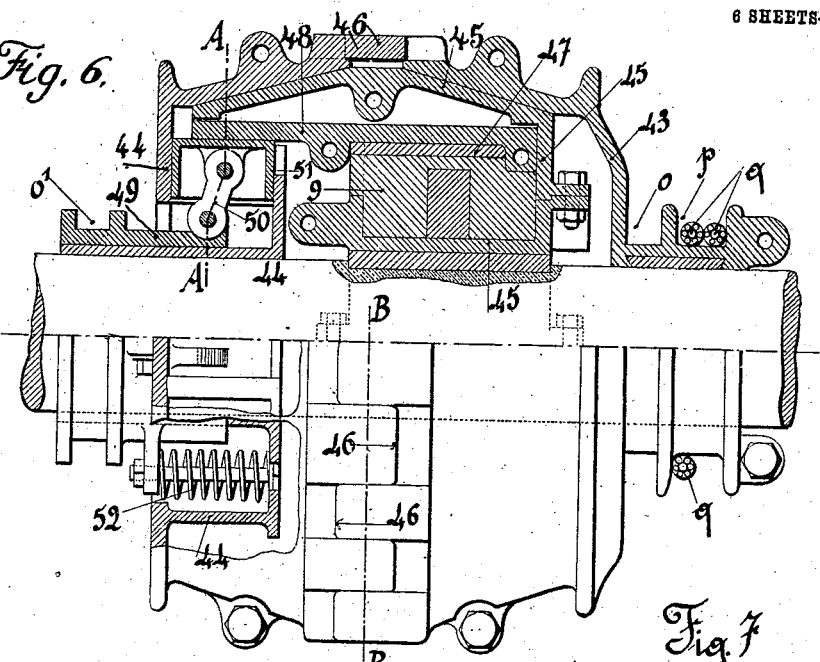
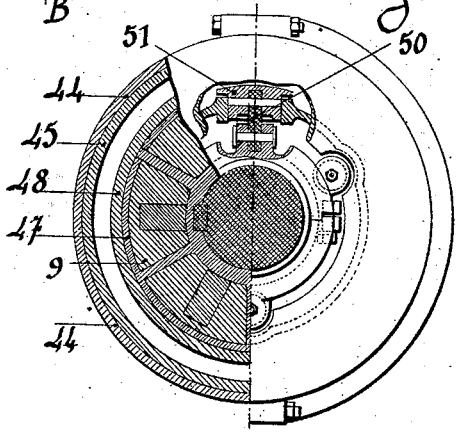
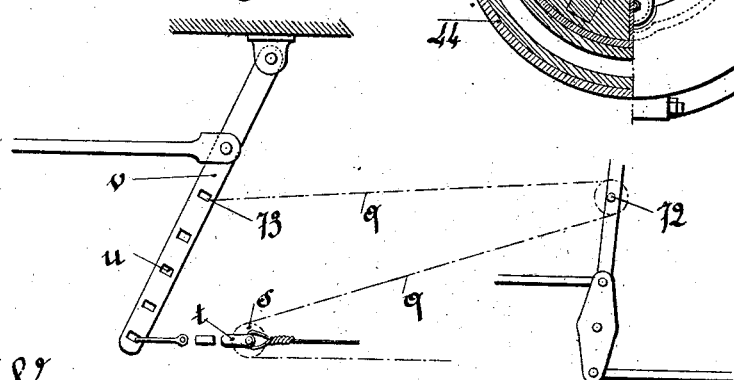
Witnesses
Inventor
Paul Hallot
By
James L. Norris No. 845,633. PATENTED FEB. 26, 1907.
P. HALLOT.
BRAKE FOR VEHICLES.
APPLICATION FILED NOV. 27, 1903.
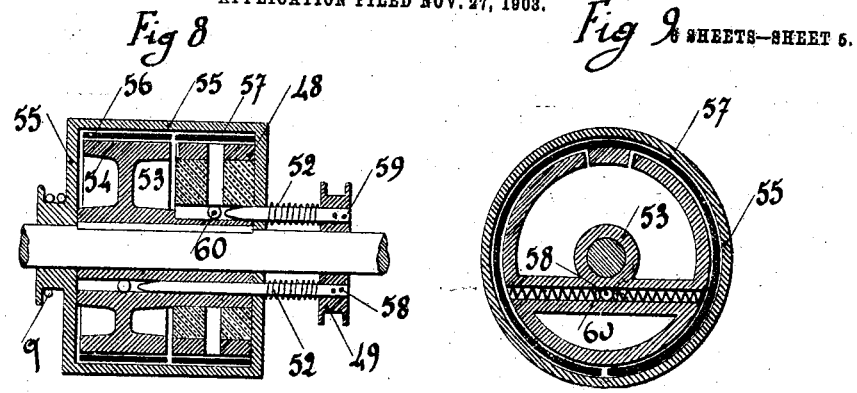
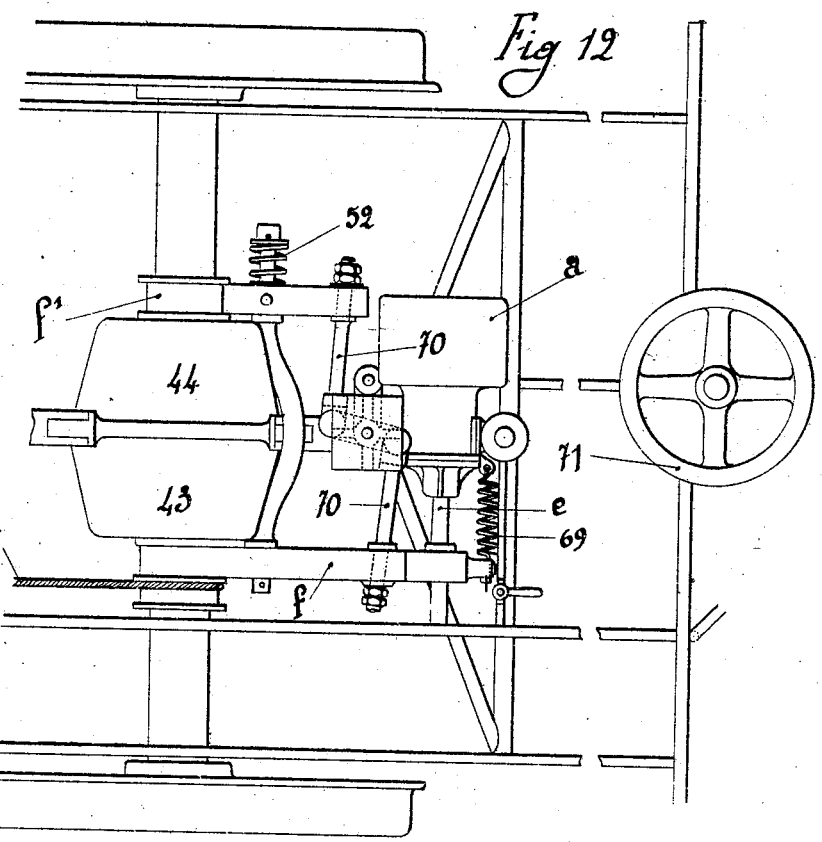

No. 845,633. PATENTED FEB. 26, 1907.
P. HALLOT.
BRAKE FOR VEHICLES.
APPLICATION FILED NOV. 27, 1903.

6 SHEETS—SHEET 6.

Witnesses

Inventor
Paul Hallot
By James L. Norris
Atty

UNITED STATES PATENT OFFICE.

PAUL HALLOT, OF VINCENNES, FRANCE.

BRAKE FOR VEHICLES.

No. 845,633.     Specification of Letters Patent.     Patented Feb. 26, 1907.

Application filed November 27, 1903. Serial No. 182,924.

*To all whom it may concern:*

Be it known that I, PAUL HALLOT, a citizen of the French Republic, residing at Vincennes, Seine, Republic of France, have invented certain new and useful Improvements in Brakes for Vehicles, of which the following is a specification.

This invention relates to vehicle-brakes.

The object of the invention is in a certain and positive manner to increase the braking power as the speed of the vehicle and the load of the same is increased and at the same time to obviate skidding of the vehicle-wheels.

The main and underlying principle of the invention is the provision of the braking action which cannot exceed a predetermined power in conjunction with an additional or supplemental braking action, under the control of the engineer, secured from the rotation of the wheel-axle and which decreases automatically with the decrease in velocity of the rotation thereof. The means employed for carrying out this principle resides in connecting or rendering operative one or more parts that operate the braking mechanism at the moment the brake is applied with one or more devices receiving rotary movement from the rotating parts of the vehicle, said connection being effected by any convenient means—such as compressed or rarefied air, fluids, or manually or electrically. The supplemental braking power is obtained by means of centrifugally-acting elements or masses, the operation of which depends upon the rotary movement of the wheel-axle.

The invention contemplates, further, the employment of appliances which will permit of the action of the brake being regulated either by hand or automatically, according to the load of the vehicle, and through the load itself.

Figure 1:
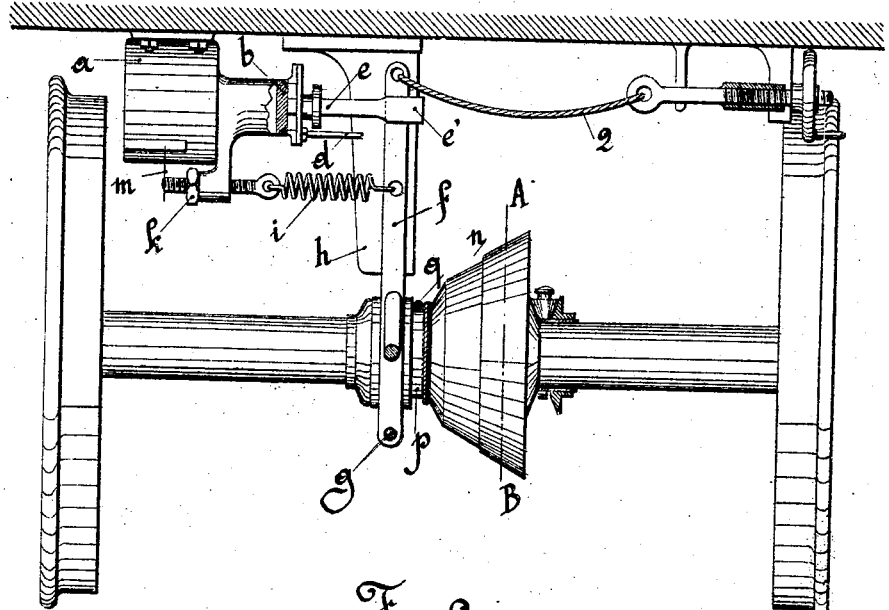
Figure 2:
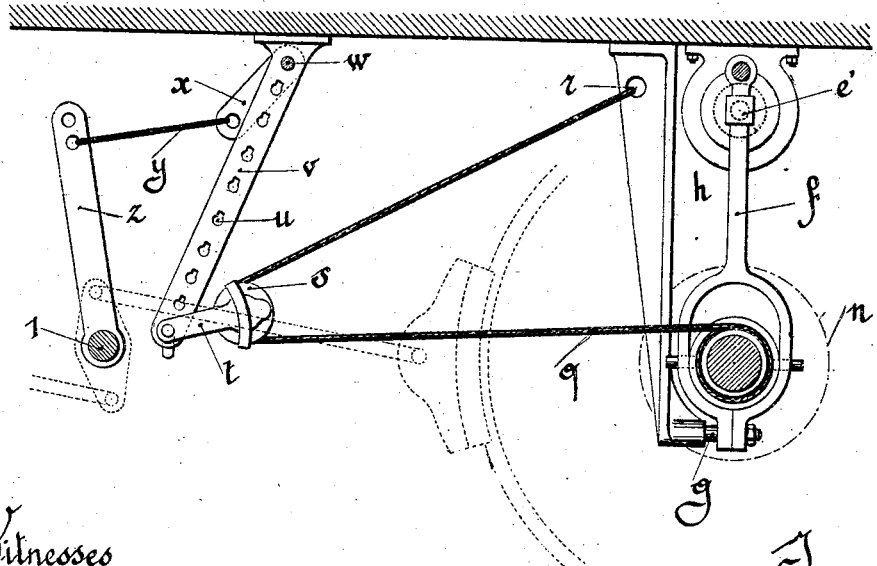
Figure 3:
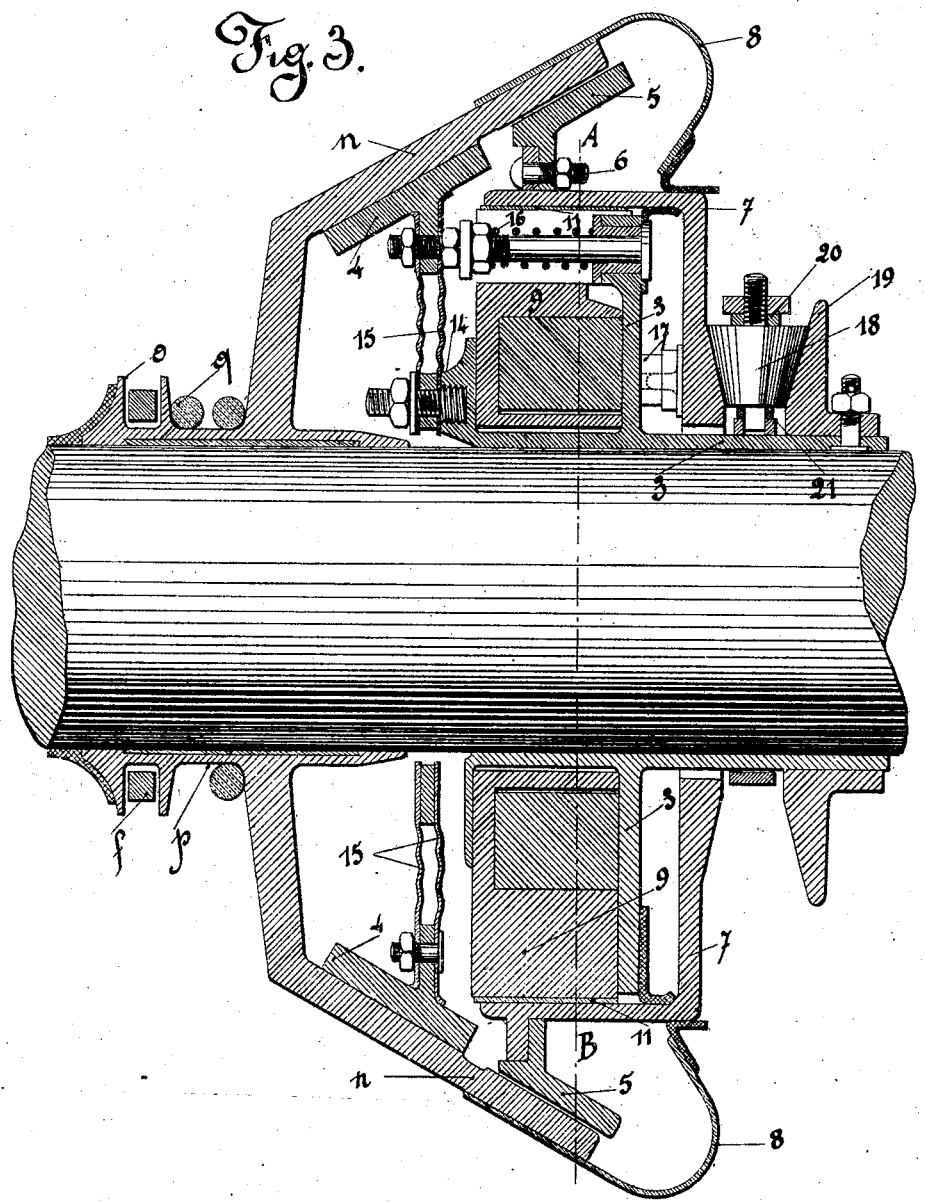
Figure 4:
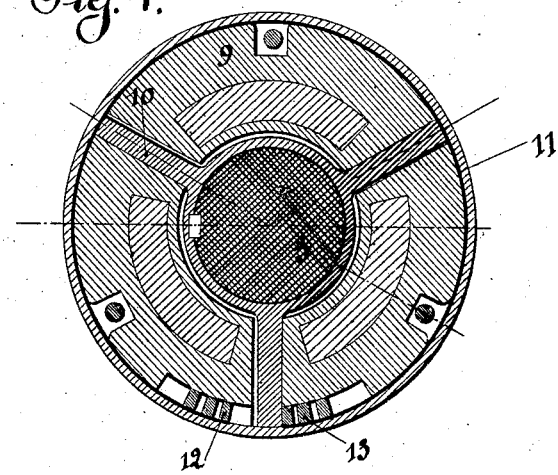
Figure 5:
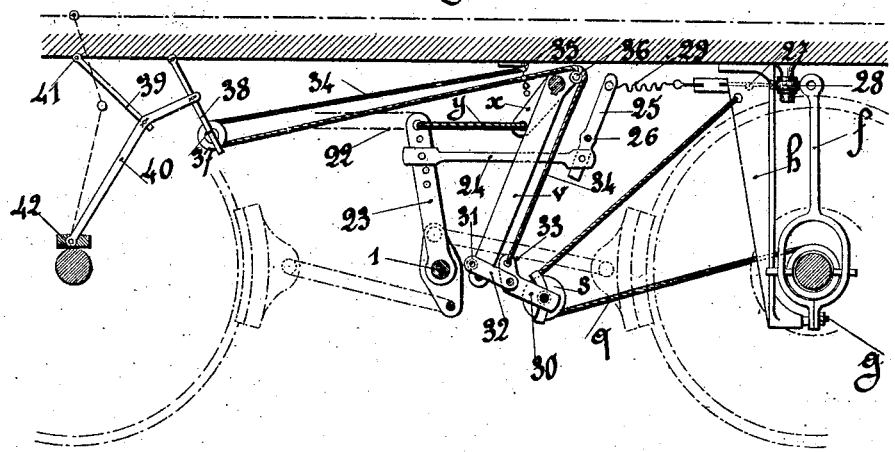

In the accompanying drawings, Figure 1 is an end view o a vehicle furnished with the new brake. Fig. 2 is a side view of Fig. 1. Fig. 3 represents, on a larger scale and in axial section, the automatic device for regulating the power in the case of a single-transmission coupling-box. Fig. 4 is a transverse section of the same, on a smaller scale than Fig. 3, along the line A B in the latter figure. Fig. 5 represents the brake applied to a vehicle already furnished with a brake of some other kind and the device for automatically regulating the brake action by means of the load of the vehicle. Fig. 6 is a partial longitudinal section and partial side elevation of a modification of the brake. Fig. 7 is a cross-section of the same through lines A A and B B of Fig. 6. Figs. 8 and 9, Fig. 10, and Fig. 11, respectively, show several modifications of this type of brake. Fig. 12 is a top view showing in what manner the brake may be operated. Fig. 13 shows in what manner the braking power may be varied.

The brake mechanism is controlled by a small air-cylinder $a$, containing a piston $b$, the leather packings of which are directed toward the interior, so that the reduction of pressure produced in the main pipe $d$ causes the piston-rod $e$ to move outward. By means of a yoke $e'$ the rod $e$ is connected with the fork $f$, which operates the coupling and which is flexibly connected with a shaft $g$, situated at the bottom of a bracket $h$. A spring $i$ permits the action of the air-cylinder on the fork $f$ to be regulated or moderated, and consequently the ratio of the load that is braked to be varied in regard to the total weight of the vehicle. For this purpose it is only necessary to turn the nut $k$ until the pointer $m$ comes opposite the required gradation of a scale or indicator shown near its upper end. This spring also effects the discoupling.

$n$ is the pulley that actuates the variable regulator, described farther on. This pulley is loose on the axle and has two grooves, one, $o$, which receives the fork $f$, the other, $p$, constituting the drum on which one of the ends of the rope $q$ is wound. The other end of this rope is attached at $r$ to a fixed point of the frame. This rope runs over a pulley $s$, Fig. 2, the attachment $t$ of which is fixed in one of the holes $u$ in the lever $v$, which acts on the brake-blocks, and to this end the upper end of this lever is keyed on a shaft $w$, which has an arm $x$, connected by rope $y$ with the lever $z$, keyed on the brake-mechanism shaft. The upper end of the fork $f$ is connected by a rope 2 to a screw device which enables the brake to be operated by hand during shunting operations on the journey as an emergency or safety brake or when standing.

A coupling-box 3, keyed to the car-axle, presents a friction-surface 4 to the pulley $n$. This surface 4 only is put into engagement for depressions below a certain limit—one thousand grams, for example. If the engineer increases the vacuum for the purpose of producing a more powerful action of the brake, he brings the operating-pulley n gradually into contact with a frictional surface 5, the piece forming which is fixed by means of bolts 6 on an intermediary pulley 7, loosely surrounding the piece 3. A flexible casing 8, forming a gear-casing, preserves the mechanism from the dust.

The regulator consists of segments 9, placed between ribs 10, Fig. 4, of the box 3, which when diverging under the action of the centrifugal force apply against the internal surface of the pulley 7 a steel plate 11, the two ends of which terminate in drivers 12 and 13, which lodge against one of the ribs 10. The cone 4 is connected with the coupling device 3 by two disks 15, made of corrugated sheet-steel, bolted onto the bosses 14. This combination, which is rigid in the direction of its diameter, but flexible in that parallel to the axle, enables the pulley n to move to the desired extent for forming contact with the cone 5. Springs 16, arranged between the corrugated sheet-metal disks 15 and the end of the coupling device 3, enable the recoil of the cone 4 to be moderated. The box 3 is kept at the desired distance from the intermediary pulley 7 by packing-disks or washers 17 of various thicknesses. The pulley 7 is supported by conical rollers 18 against an abutment 19, formed on the circumference of the box 3.

The action of this brake is as follows: The depression produced in the main pipe $d$ forces the piston-rod $e$ outward and the fork $f$ to press the operating-pulley $n$ against the coupling-surfaces 4 and 5. For ordinary braking, the cone 4 only is employed. The pulley $n$ rotates and winds onto the drum $p$ the rope $q$ (which operates the brake mechanism) until the tension of this rope is sufficient to balance the driving force of the cone 4. At this moment the pulley $n$ is further displaced at the will of the engineer, and in turn the cone 5 comes into engagement. The pulley $n$ is thus again actuated, which produces a new tractional strain on the rope $q$, causing an increase of the braking power, but so regulated that there can be no skidding of the wheels of the train. The speed of rotation of the axle is consequently diminished, and the force of the pulley 7, due to the segments 9 of the regulator, decreases as the square of the speed, and the cone 5 is accordingly partially relaxed. When the speed of the axle falls below a certain limit, the braking action is reduced to that which is effected by the contact of the cone 4, no matter what depression may be effected by the engineer. Fig. 5 shows the application of this regulator to a vehicle already furnished with a brake of any kind, with the object of automatically varying the braking power according to the load of the vehicle. In all these mechanical contrivances the controlling member 22 is connected with the shaft 1 by an operating-lever, such as 23. It is only necessary to interpose between this lever 23 and the coupling-fork $f$ a link 24, fixed to the lever 23 and to a lever 25, turning around a fixed point 26. The upper end of the lever 25 is connected with the fork $f$ by a rope 27, which runs over a pulley 28, fixed to the frame, on which, if desired, a spring 29 of variable tension may be placed. Finally the arm $x$, mounted on the shaft $w$ of the lever $v$, is connected by a rope $y$ to the brake-operating lever 23.

A special device enables the braking action to be varied automatically with the load of the vehicle. For this purpose the yoke of the pulley $s$ is formed of two articulated parts 32 and 30. The back part 32, which is connected with the lever $v$, terminates in a roller 31, facilitating its displacements along this lever. The front part 30 is bent and terminates in a friction-cam 33, drilled with a hole in which a suspension-rope 34 is attached, which is fixed at the other end to the frame of the vehicle at 35 by means of a suitable elastic connecting device. This rope runs over a roller 36 and over a pulley 37, placed at the end of the lever 38 of a flexible arrangement 39 40, which is supported at 41 on the frame of the vehicle and at 42 at a fixed point connected with the axle. When the distance between the points 41 and 42 varies under the effect of the load, the rope 34 unwinds to a certain extent from the fixed point 35 and moves the clutch 30 along the lever $v$, so that in consequence of the lowering of the frame a certain position of the clutch 30 on this lever $v$ corresponds to each loading of the vehicle and a certain additional action of the rope $q$ on the brake mechanism. This automatic regulation could be replaced by manual regulation simply by bringing the rope 34 on the sides of the vehicle.

The apparatus illustrated in Figs. 6 and 7 is a modification of the above-described brake. It comprises two pulleys 43 and 44, each having an inner friction-surface intended to come in contact with the externally-corresponding surface of a central sleeve 45. The first two pulleys are loose on the car-axle where the central sleeve is keyed on the said axle. The pulley 43 has two grooves, one of which, $o$, receives the operating-fork $f$, and the other, $p$, the rope $q$. The two pulleys are adapted to slide on the axle independently of each other, but they are caused to rotate together by means of a clutch device, such as that shown at 46, or by any other convenient means. The central sleeve 45 is provided with radial ribs 10, between which are lodged centrifugal masses 9, which act on the inner surface of an intermediary pulley 48, to which they communicate their rotary movement. Friction-blocks 47 are interposed between said masses and the pulley 48. The boss of the pulley 44 is in form of a sleeve, on which is adapted a slide-block 49, which can move in a direction parallel to the axle. Said slide 49 is connected by means of a number of links 50 to corresponding friction-shoes 51, arranged radially and moving in convenient casings of the pulley 44, Fig. 7. The external surface of the shoes 51 can be brought into contact with the internal surface of the intermediary pulley 48. To this end the slide 49 has an annular groove o'; in which fits the other operating-fork f'. Between the bottom of the pulley 44 and the slide 49 a number of springs 52 are interposed, said springs being of such a strength that they only yield for a predeterminated power. This apparatus works as follows: The car-axle continually communicates rotary motion to the central sleeve 45 and also to the intermediary pulley 48 by means of the masses 9. At the beginning of the braking action the operating-levers f and f' act simultaneously to bring the pulleys 43 and 44 against the friction-cones of the central sleeve 45, but without causing the springs 52 to yield. The rope q therefore is subjected to a predetermined tension which is limited by the initial tension of the springs 52. The engineer can at his will produce at this moment an additional action which causes the springs 52 to yield and the shoes 51 to enter in contact with the intermediary pulley 48 and to become frictionally locked therewith. The system of the two friction-pulleys is in consequence subjected to a greater friction, from which arises a greater tension of the rope q. While the rotation of the axle decreases owing to the action of the brake, the friction of the segments 47 on the pulley 48 decreases with the centrifugal force. The pulleys 43 and 44 are therefore subjected to a less strain, in consequence of which the tension of the rope and the action of the brake are reduced. It is therefore to be understood that skidding of the wheels can never take place.

Figs. 8 and 9 show another construction of a brake according to the present invention. A sleeve 53, keyed on the car-axle, withdraws in the rotary motion of this axle on one side the friction-pulley 54 and on the other side the centrifugal masses 9, which act on the intermediary pulley 48. The drum on which is wound the rope q forms a part of a winch-pulley 55, which completely surrounds the sleeve 53 and the pulleys 54 and 48. The friction between the inner surface of the pulley 55 and the external surfaces of the pulleys 54 and 48 is produced by means of two circular flat spring-plates 56 and 57, placed in the free annular space between the pulleys. Each of these spring-plates is fixed at its middle point to the periphery of the corresponding pulley, so as to participate in the rotary motion of these latter. The sleeve 53 has two holes or channels parallel to the axle, in which holes are adapted to slide two pointers 58 and 59, secured to an operating-sleeve controlled by the fork f. The sleeve 53 is further provided in the axis of each of the pulleys 54 and 48 with two other holes, the direction of which is perpendicular to that of the axle. In these latter holes are provided springs 60 for the purpose of pressing the spring-plates 56 and 57 against the inner surface of the pulley 55 when said springs have been pressed apart by the pointers 58 and 59. At the beginning of the braking action the plate 56 works alone as long as the graduated springs 52 have not yielded. If the engineer desires to increase the action of the brake, he causes in turn the pointer 59 to separate the corresponding springs 60. The plate 57 then adds its effect to that of the plate 56 according to the centrifugal action of the masses 9, which act upon the pulley 48.

Figures 10, 11:
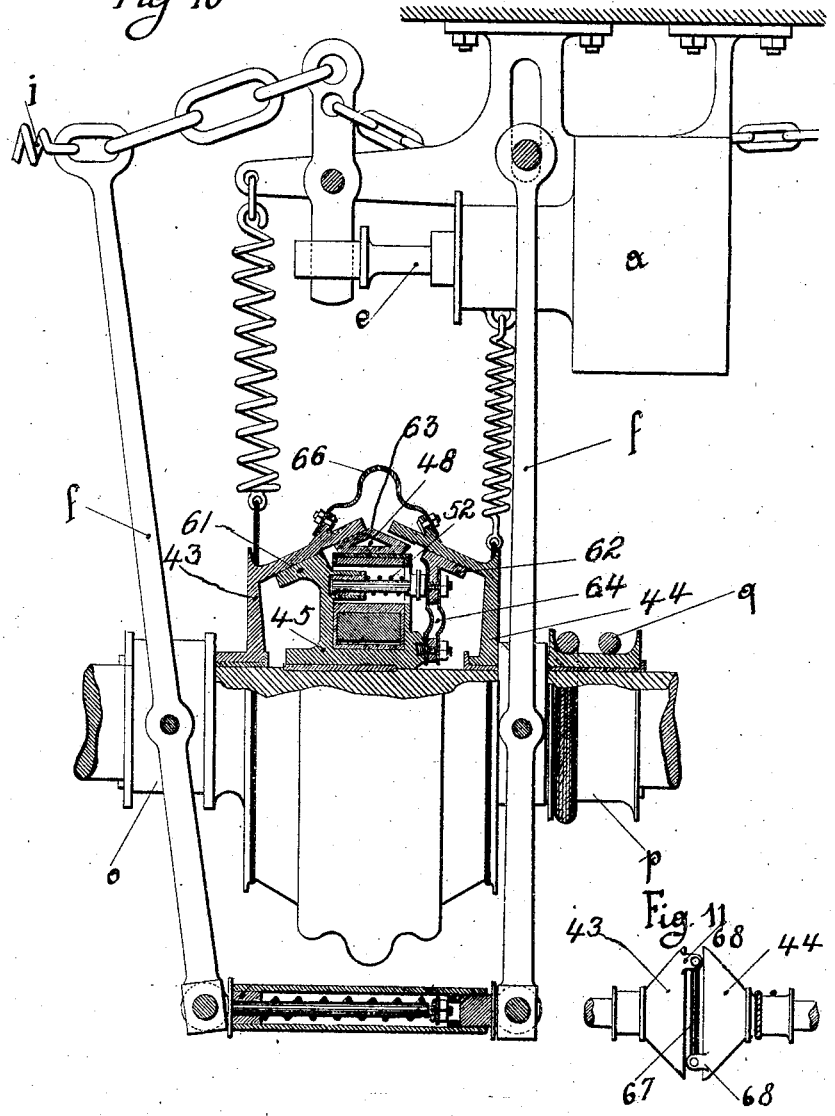

Fig. 10 shows another constructive modification of a brake according to the present invention. The two friction-pulleys 43 and 44, controlled by the forks f and f', (which forks are connected to each other at their lower ends by means of a yielding joint,) are adapted to come into contact with the two cones 61 and 62, secured on a sleeve 45, keyed on the shaft, and with an intermediary pulley 48, having a double-coned friction-surface 63, which is caused to participate in the rotation by the masses 9. The conical surface 62 is connected to the sleeve 45 by means of flexible disks 64. Graduated springs 52 limit the initial action of the brake to a predeterminated value. The pulleys 43 and 44 are connected together by means of a corrugated sheet-iron plate 66, which at the same time protects the parts from dust. When the engineer progressively increases the action on the fork f, he first brings into contact the system 43 44 with the cones 61 and 62, then with the double-coned surface 63 of the intermediary pulley. The tension of the rope q is obviously the more considerable as the number of the rubbing parts is the greatest and as the masses 9 produce more force on the pulley 48.

Fig. 11 shows another arrangement for connecting together the pulleys 43 and 44 by means of lugs and connecting-rods 67.

Fig. 12 shows another arrangement for operating the forks f and f', which corresponds to Figs. 6 and 7. One of these forks f is directly controlled by the piston-rod e of the air-cylinder a, it being assumed that the brake is operated by means of compressed air. An adjustable spring 69 counteracts on this rod to press back the fork. The two forks are connected together by a system of levers 70, arranged in such a manner that both forks work simultaneously. These levers can be controlled by hand by means of the hand-wheel 71.

Fig. 13 shows diagrammatically various means for varying the braking power independently of the brake itself only by the arrangement of the rope q. This rope can be merely secured to the lever v, which operates the brake mechanism, by means of a yoke t. Said lever may be provided with holes u, so that, all other conditions remaining the same, the action of the brake will vary according to the position of the yoke t on the lever v. If it is desired to increase the power of the brake for a determined position of the yoke t, it is only necessary to secure the rope q to a fixed point of the frame of the car, Fig. 2, by passing said rope on a pulley s, supported by the yoke t. If it is desired to act with a greater force, the free end of the rope q may be attached to a convenient point 72 of the brake mechanism in order to utilize the resistance of the supporting-point r. If, finally, it is desired to further increase the power of the brake, it is only necessary to place a pulley at 72 and to secure the free end of the rope q to a convenient point 73 of the brake mechanism. Fig. 13 shows clearly that under these conditions all the sections of the rope q act to increase the braking power for a given tension imparted to this rope by the brake.

What I claim is—

1. The combination with an axle, of a normally non-rotative brake-actuating member, and yielding means for locking and holding the member against rotation.

2. The combination with an axle, of a normally non-rotative brake-actuating member, means for locking and holding the member against rotation up to a predetermined resistance, and means to permit yielding of the locking means when a predetermined resistance has been exceeded.

3. The combination with an axle, of a normally non-rotative brake-actuating member, means for locking and holding the member against rotation, and supplemental locking means normally out of engagement with the actuating member, and means controlled by the speed of rotation of the axle for causing the supplemental locking means to engage the actuating member.

4. The combination with an axle, of a normally non-rotative brake-actuating member, means for locking and holding the member against rotation, and supplemental locking means normally out of engagement with the actuating member, and means controlled by the speed of rotation of the axle for causing the supplemental locking means to engage the actuating member and for releasing the supplemental locking means when the speed of rotation of the axle is reduced to a predetermined point.

5. The combination with an axle, of a normally non-rotative brake-actuating member, means for locking and holding the member against rotation up to a predetermined resistance, a secondary locking means normally out of engagement with the actuating member, and centrifugally-actuated devices controlled by the speed of rotation of the axle to move the secondary locking means into and out of engagement with the actuating member.

6. The combination with an axle, of a pulley loosely mounted thereon and provided with a cone-shaped band, a shoe rigid with the axle, and disposed within the band, means for permitting yielding of the shoe, and means for moving the pulley into and out of engagement with relation to the shoe.

7. The combination with an axle, of a casting rigid therewith, weights loosely carried thereby, a pulley loosely mounted on the casting and carrying a shoe, means for holding the pulley properly spaced with relation to the casting, and from longitudinal movement on the axle, a second shoe carried by the casting, a pulley loose on the axle and having a cone-shaped band housing the two shoes, and means for moving the pulley to and from the shoe.

In testimony whereof I have hereunto set my hand in presence of two subscribing witnesses.

PAUL HALLOT.

Witnesses:
H. C. COXE,
ALFRED FREY.